United States Patent Office 3,598,527
Patented Aug. 10, 1971

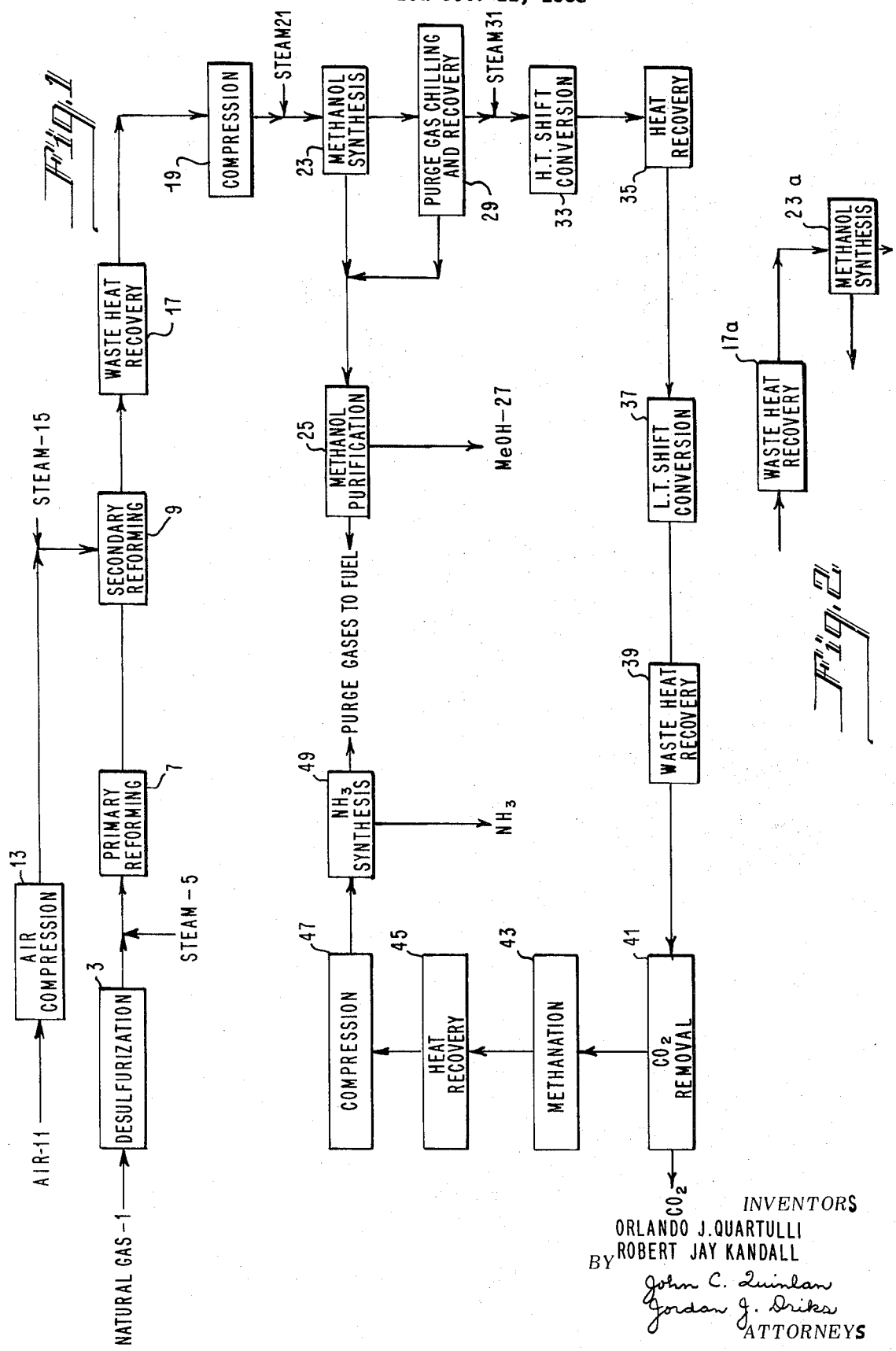

3,598,527
AMMONIA AND METHANOL PRODUCTION
Orlando J. Quartulli, Bronx, and Robert Jay Kandall, Flushing, N.Y., assignors to Pullman Incorporated, Chicago, Ill.
Filed Oct. 11, 1968, Ser. No. 766,723
Int. Cl. C01c *1/04, 29/16;* B01j *9/00*
U.S. Cl. 23—199                                    10 Claims

ABSTRACT OF THE DISCLOSURE

A process is provided for the manufacture of methanol and ammonia comprising operating sequentially a high pressure hydrocarbon reforming zone in series with a low pressure methanol synthesis zone, in series with a water shift conversion zone, in series with a carbon dioxide removal zone, in series with an ammonia synthesis zone. Such combination takes advantage of the newly developed low pressure methanol process and thereby saves substantial operating costs in carbon dioxides compression in addition to substantially investment costs by utilizing a single process train instead of the heretofore employed independent methanol and ammonia plants.

BACKGROUND OF THE INVENTION

At the present time, it is considered uneconomical to build and operate new, low capacity methanol plants based on the use of reciprocating compressors. Recently, a new low pressure process was developed for the production of methanol. That new process, utilizing centrifugal compressors, made it economically feasible to build and operate low capacity methanol plants. Although the new low pressure process was an advance in the art, even greater benefits can be realized using the integrated facility and process of the present invention in terms of lowered capital investment and reduced operating costs.

Carbon dioxide compressors were required in methanol production because the feed normally used, such as natural gas, when reformed, did not contain sufficient carbon oxides for the amount of methanol which could be prepared from a given amount of feed gas and carbon dioxide from an extraneous source was supplied to the methanol manufacturing facility using an expensive compressor. Moreover, during the ammonia synthesis, excess carbon dioxide was generally wasted unless there was a methanol, or other carbon dioxide consuming manufacturing facility nearby, in which case the carbon dioxide would then be compressed and delivered to the carbon dioxide consuming facility. In the methanol manufacturing facility, hydrocarbon feed was reformed and methanol synthesis was catalytically conducted at elevated temperature and pressure. Thus, there was necessary duplication of equipment and manpower in separate ammonia and methanol manufacturing facilities. Additionally, the methanol manufacturing facility was often dependent upon a neighboring ammonia manufacturing facility for a supply of carbon dioxide needed in the methanol synthesis. As is apparent, when something occurred in the ammonia facility which adversely affected the supply of carbon dioxide available from the ammonia facility, the methanol facility often was forced to curtail or shut down its production.

An object of this invention, therefore, is to provide a process for integrating the production of methanol and ammonia.

Another object is to reduce the initial investment required in establishing a methanol manufacturing facility.

Still another object is to reduce the operating costs for both a methanol and ammonia manufacturing facility by providing a unified single train of equipment.

Yet another object is to avoid duplication of manufacturing facilities for ammonia and methanol production.

Still another object is to reduce the dependency of a methanol manufacturing facility upon the supply of carbon dioxide from an ammonia or other carbon dioxide producing manufacturing facility.

Other objects and advantages will become apparent from the following more complete description and claims.

SUMMARY OF THE INVENTION

Broadly this invention contemplates an integrated process for the production of methanol and ammonia comprising converting a substantially sulfur free hydrocarbon feed into hydrogen and carbon oxides in an amount sufficient to supply the combined hydrogen requirements of a given methanol and ammonia production rate and sufficient to supply the carbon oxide requirement for said given methanol production rate, introducing an oxygen-containing gas during conversion of said hydrocarbon feed, and when said oxygen-containing gas is insufficient to satisfy the nitrogen requirement for said given ammonia production rate, introducing nitrogen into said process subsequent to said methanol production, catalytically synthesizing methanol from a portion of the converted gases and purifying said methanol, removing a second portion of said gases, which contain hydrogen and equivalent hydrogen in an amount sufficient to satisfy the stoichiometry for said given ammonia production rate, converting equivalent hydrogen to actual hydrogen, removing carbon oxides and catalytically synthesizing ammonia.

This invention also contemplates an integrated manufacturing facility for the production of methanol and ammonia comprising a series of zones, gas conducting means between said zones and connected thereto and a plurality of heat recovery means interspersed between and communicating with at least some of said zones, said zones consisting essentially of means for converting a hydrocarbon feed into hydrogen and carbon oxides at elevated temperature and pressure whereby the combined hydrogen and carbon oxide requirements for a given ammonia and methanol production rate are satisfied, means for introducing an oxygen containing gas into said converting means, a methanol synthesis loop, means for catalytically synthesizing methanol at elevated pressure and temperature as part of said loop, and when said pressure is insufficient for synthesizing methanol, including means for achieving a methanol synthesis pressure prior to said means for synthesizing methanol, means for purifying methanol, means for cooling and recovering a portion of said gases from said methanol synthesizing means, and when said portion of said gases contains insufficient nitrogen for said ammonia production rate, including means for introducing nitrogen into said portion of said gases subsequent to said methanol synthesis loop, a shift converter for converting equivalent hydrogen of said converted gases into actual hydrogen, means for introducing steam into said gases prior to the shift conversion, a carbon oxide removal system, an ammonia synthesis gas make-up compressor and an ammonia synthesis loop, whereby ammonia and methanol are synthesized from a single train of equipment and duplication of equipment and costly equipment are eliminated.

DETAILED DESCRIPTION OF THE INVENTION

Referring now the drawing: FIG. 1 is a schematic flowsheet of the process of this invention as well as a schematic facility.

FIG. 2 illustrates another embodiment of the present invention.

A hydrocarbon feed 1 (natural gas), is conducted into a desulfurization chamber 3 containing activated carbon as the desulfurizing agent where, at ambient temperature, substantially all of the sulfur compounds are removed from the feed in order to avoid poisoning the reforming and other catalysts which will later be described in more detail. After desulfurization, steam 5 is introduced into the feed in a predetermined steam to organic carbon ratio of 3.0 to 1 and the hydrocarbon feed-steam mixture, after preheating to 975° F., flows into a primary reformer 7 containing a nickel oxide catalyst. Under the influence of the catalyst and an inlet temperature of 975° F. and an outlet temperature of 1600° F. a major portion of the gases is converted to hydrogen and carbon oxides. An inlet pressure of 500 pounds per square inch gauge (p.s.i.g.) and an outlet pressure of 450 p.s.i.g. is employed for primary reforming. This conversion is not a complete one and the gases are then passed into a secondary reformer 9 where air 11 is introduced via an air compressor 13 in an amount sufficient to satisfy the nitrogen requirement for a given ammonia production rate and to elevate the temperature, from an inlet temperature of 1600° F. to an outlet temperature of 1803° F., which temperature is required to complete the hydrocarbon reforming. Steam 15 is also introduced during secondary reforming. During secondary reforming, and intermediate the inlet and outlet of the secondary reformer 9, the temperature is about 2300° F. The reformed gases are then introduced into heat exchange equipment 17 where the temperature of the reformed gases is lowered to 100° F. The recovered heat may be used to produce steam, preheat boiler feed water, and supply process heat. The cooled reformed gases, after removal of condensed steam therefrom, pass into a compressor 19 which compresses the gases to a methanol synthesis pressure of 750 p.s.i.g. Under certain conditions, as will be later described, a compressor is not necessary. From the compressor, if used, the gases flow, with the introduction of steam 21 therein, to a methanol synthesis converter 23 where methanol is catalytically synthesized, at temperatures of 484° F. to 518° F. and a pressure of 750 p.s.i.g., from a portion of the gases. After separation of the crude methanol from the gas stream, the crude methanol flows into a methanol purification system 25 where high boiling and low boiling impurities and water are removed, and refined methanol 27 is withdrawn from the system. An unreacted portion of the gases from the methanol synthesis converter 23 is withdrawn and passed through cooling and recovery equipment 29 to remove methanol and impurities. The cooled withdrawn portion of the gases is reheated to a temperature of 700° F., combined with steam 31 and conducted to a high temperature shift converter 33. In the shift converter 33, additional hydrogen is produced by reacting the carbon monoxide present in the gases with steam to produce carbon dioxide and hydrogen. The amount of total hydrogen in the converted gases is sufficient to satisfy the stoichiometry for the production of ammonia and the hydrogen requirement for methanation of residual carbon oxides. The gases then leave the high temperature shift converter 33 at a temperature of 775° F. and enter a heat recovery system 35 where the gases are cooled and the recovered heat is used to produce steam. The gases now enter a low temperature shift converter 37, at a temperature of 463° F., which substantially completes the steam conversion of carbon monoxide into hydrogen. After the gases leave the low temperature shift converter 37 at a temperature of 489° F., they are introduced into additional heat recovery equipment 39, wherein the gases are cooled and from which condensed steam is removed. The gases are then delivered to a carbon oxide removal system which includes a gas scrubbing system 41 provided with a suitable regenerative solvent for removing carbon dioxide. After substantially all of the carbon dioxide has been removed, the gases flow to a methanator 43 where residual carbon oxides are converted to methane by catalytically reacting the carbon oxides with a small amount of the hydrogen contained in the gas stream. Removal of said residual carbon oxides is required to avoid poisoning the ammonia synthesis catalyst. After further heat recovery 45, the gases flow to a synthesis gas compressor 47 which elevates the pressure of the gases to 2100 p.s.i.g. Finally, a portion of the gases are preheated to 770° F. and are introduced into the ammonia synthesis converter 49 where, under the influence of elevated temperature and pressure, ammonia is catalytically synthesized. The portion of the ammonia converter synthesis gas which is not preheated is used as quench to control the temperature levels within the converter 49. The gases leave the converter at 850° F. Inert methane and argon, which are present in the ammonia synthesis gas, are continuously purged from the ammonia synthesis loop. The purge gas is used to supply a portion of the fuel required for operation of the primary reforming facility.

In the embodiment of this invention shown in FIG. 2, a methanol synthesis gas compressor and steam introducing means immediately following the compressor are not used and the methanol synthesis gas flows from the heat exchange equipment 17a to the methanol synthesis loop which includes a methanol synthesis converter 23a. When a compressor is not used, a typical reforming temperature and pressure is, for the primary reformer, an inlet temperature of 975° F., an outlet temperature of 1600° F. and a pressure of 750 p.s.i.g.; and for the secondary reformer, an outlet temperature of 1800° F. and a pressure of 740 p.s.i.g. The temperature of the reformed gases is lowered to 260° F. Prior to the flowing of the methanol synthesis gas into the methanol synthesis loop.

Although the invention has been illustrated by means of a flowsheet and specific process conditions and equipment, the following discussion more fully describes the conditions and equipment set forth in the flowsheet.

FEED GAS

The hydrocarbon feed used in practicing this invention is used in an amount which, when converted into raw synthesis gas, will satisfy the hydrogen and carbon oxide requirements for a given methanol and ammonia production rate.

When calculating the amount of hydrogen required for the given ammonia production rate, some of the carbon monoxide, which is produced upon conversion of the feed gas into raw synthesis gas, is considered as equivalent hydrogen or potential hydrogen in view of the fact that during shift conversion some of the carbon monoxide will be converted to carbon dioxide by catalytically reacting the carbon monoxide with steam to produce an equivalent amount of hydrogen thereby satisfying the hydrogen requirement for methanation and the given ammonia production rate. Therefore, the term "equivalent hydrogen" as used in the specification and claims means carbon monoxide which is reacted with steam to produce gaseous hydrogen.

The hydrocarbon feed used in this invention may be a gas, or a liquid which is capable of being introduced into the primary reformer as a vapor. Among the hydrocarbon feeds which may be used in practicing this invention are natural gas, refinery gas, liquid petroleum gas, butane, light naphtha, for example, with a boiling point up to about 300° F. to 350° F., and heavy naphtha, for example, with a boiling point up to about 400° F. to 450° F. Where available, it is preferred to use natural gas as the hydrocarbon feed. Other hydrocarbon feeds, which are well known in the art may also be used. The invention, however, is not to be construed as limited to the use of any one particular feed.

The hydrocarbon feed used generally will contain sulfur impurities. These sulfur-containing impurities must be removed from the feed so that less than 0.5 part per million remains in order to avoid poisoning the catalysts used in this process. Some of the impurities which may be found in the feed, depending upon which feed is used, are hydrogen sulfide, mercaptans, sulfides, disulfides, carbonyl sulfide, and other sulfur compounds.

The material used to remove the sulfur-containing impurities will vary depending upon the type of impurity present. Among the desulfurizing agents which may be used are activated carbon, zinc oxide, cobalt and molybdenum oxides with zinc oxide and the like. The conditions under which the sulfur-containing impurities are removed will also vary with the agent used. Generally, desulfurization will take place between ambient and elevated temperature depending on the agent used and the type of impurity present. For example, natural gas is desulfurized at ambient temperature using activated carbon and at 650° F. to 750° F. using zinc oxide.

When the hydrocarbon feed is desulfurized, the feed is passed through a desulfurizer, which is a vessel containing a bed of desulfurizing agent through which the feed passes.

CONVERSION OF FEED GAS INTO SYNTHESIS GAS

The desulfurized hydrocarbon feed may be converted into raw synthesis gas by catalytically reforming the hydrocarbon feed, using steam, where at elevated temperature and pressure, the feed is converted into hydrogen and carbon oxides. Although there are other methods for converting a hydrocarbon feed into synthesis gas, such as by the partial oxidation of a hydrocarbon feed employing an oxygen enriched atmosphere and a temperature of from about 2000° F. to about 3000° F., it is preferred that the raw synthesis gas be produced from the hydrocarbon feed by catalytic reforming of the desulfurized feed.

Catalytic reforming is accomplished over a relatively wide range of operating conditions and includes primary and secondary reforming steps.

The temperature at which primary reforming is conducted may vary widely from an inlet temperature of between about 600° F. to about 1200° F. to an outlet temperature of from about 1350° F. to about 1700° F. The reforming temperature used will vary, within the range set forth above, depending upon the desired degree of reforming of the hydrocarbon feed. The desired degree of reforming will itself depend in part on the given ammonia to methanol production ratio.

The pressure employed in the primary reforming step may vary widely. Generally, a pressure of from about 250 to about 1000 p.s.i.g. is satisfactory. It is preferred to utilize a pressure of between about 450 to about 850 p.s.i.g. and particularly preferred to utilize a pressure of 750 p.s.i.g.

Generally, space velocities in the primary catalytic reforming zone between about 1000 and about 4000 volumes, at standard conditions (60° F. and atmospheric pressure), of $C_1$ hydrocarbon equivalents per hour per volume of reforming catalyst are employed, and in commercial practice more usually a space velocity between about 1500 and about 2000 is used.

The steam-carbon ratio will also vary from between about 2.0 and 5.0 to 1. The steam-carbon ratio employed will vary depending upon the reforming pressure and the ratio of a given ammonia production rate to a given methanol production rate. Generally, the higher the ratio of the ammonia production rate to the methanol production rate, the less the amount of steam required.

The catalyst used may also vary and will be dependent to some extent on the hydrocarbon feed used as well as the temperature utilized. Among the catalytic agents which may be used are nickel, nickel oxide, cobalt, cobalt oxide, chromia, molybdenum oxide, and the like. The catalyst used may also include promoters such as nickel promoted with sodium hydroxide or potassium carbonate, alkali metal, alkaline earth metal oxides and the like.

Other catalysts of high activity may be employed in this invention without departing from the scope thereof.

The catalyst may be arranged in the primary and secondary reformers as follows. The catalyst is packed in a plurality of tubes located within the radiant section of the reformer furnace. The hydrocarbon feed flows through these tubes where said feed is converted to synthesis gas. From the primary reformer, the partially reformed feed passes into a secondary reformer. The purpose of the secondary reformer is to complete the reforming of the feed.

An oxygen-containing gas is introduced into the secondary reformer via an air compressor. The oxygen-containing gas is preferably air and is introduced in an amount sufficient to satisfy the nitrogen requirements for the predetermined rate of ammonia production and to support combustion within the secondary reformer.

Instead of introducing air into the secondary reformer, a mixture of oxygen and nitrogen, oxygen enriched air, or oxygen only may be piped into the secondary reformer. The term "oxygen-containing gas" as used in the specification and claims means substantially oxygen only, oxygen enriched air, oxygen and nitrogen, or air.

When the oxygen-containing gas which is introduced into the secondary reformer is substantially oxygen only or contains an amount of nitrogen insufficient to satisfy the nitrogen requirement for the given ammonia production rate, the nitrogen requirement for the predetermined rate of ammonia production is satisfied by piping a sufficient amount of nitrogen into the system at any point subsequent to the methanol synthesis step and prior to ammonia synthesis.

The overall reactions which take place in the secondary reformer are two-fold. Upon the introduction of the oxygen-containing gas, the initial reaction is the combustion of a portion of the gases present. The second reaction is the endothermic catalytic reforming reaction.

The pressure at which secondary reforming is conducted is much the same as the pressure at which the primary reforming takes place.

The temperature at which secondary reforming takes place will vary from about 1650° F. to about 1950° F. at the outlet. The temperature used will depend upon the relative methanol and ammonia production rates as well as other factors. Generally, the higher the ratio of ammonia production to methanol production, the greater will be the secondary reformer operating temperature, and consequently, less catalyst will be required.

Steam may also be introduced during secondary reforming. The amount of steam introduced during secondary reforming will depend on the desired degree of hydrocarbon feed conversion and the operating pressure used.

The catalyst used for secondary reforming may vary widely. Generally, a nickel catalyst is used for secondary reforming of the hydrocarbon feed. Although the catalyst used for secondary reforming may be the same as any of the catalysts which may be used during primary reforming of the hydrocarbon feed, it may also be a different catalyst which is less active and less expensive than the catalyst used for primary reforming. A less expensive catalyst will generally be used because secondary reforming is conducted at a temperature which is higher than the temperature at which primary reforming is conducted. Therefore, secondary catalytic reforming will take place more readily at the high temperature so that a less active catalyst may be used.

The secondary reformer zone is arranged as a single catalyst bed contained in a refractory lined vessel.

The raw synthesis gas leaving the secondary reformer passes into a series of heat exchangers and is cooled to recover heat. The recovered heat is used to produce steam for the primary and secondary reformers and to supply heat for other process services. The cooled gas are now at the proper temperature and pressure for the methanol loop wherein the synthesis of methanol occurs.

METHANOL SYNTHESIS

A compressor need not be used to achieve the necessary methanol synthesis pressure. However, it should be noted that primary and secondary reforming may take place at somewhat lower pressure, i.e., as low as about 250 p.s.i.g. When the reforming of the hydrocarbon feed is conducted at such lower pressures, then a centrifugal compressor is employed to achieve the desired synthesis pressure subsequent to the cooling of the gases to about 100° F. and below, and recovery of the waste heat.

The composition of the synthesis gas, prior to the conversion of a portion of said snythesis gas in the methanol synthesis converter, will vary depending upon the type of feed processed in the reforming facility and the desired ammonia and methanol production rates. A typical synthesis gas composition, on a wet basis, based on a desired ammonia to methanol production ratio of about 2.0 to 1.0, a natural gas feed and the introduction of air during reforming, is as follows:

| | Percent by volume |
|---|---|
| Carbon monoxide | 13.00 |
| Carbon dioxide | 7.45 |
| Hydrogen | 58.85 |
| Nitrogen | 16.04 |
| Argon | 0.21 |
| Methane | 1.02 |
| Water | 3.43 |
| | 100.00 |

There are three basic overall reactions which take place in the methanol synthesis converter although there are other minor reactions which also take place in the converter. These reactions are as follows:

(a) $$CO + 2H_2 \rightarrow CH_3OH$$

(b) $$CO_2 + 3H_2 \rightarrow CH_3OH + H_2O$$

(c) $$CO_2 + H_2 \rightarrow CO + H_2O$$

The reactions in the methanol synthesis converter occur under the influence of elevated temperature and pressure and in the presence of a catalyst.

The temperature for methanol synthesis may vary from about 320° F. to about 570° F. and preferably from about 375° F. to about 520° F. Although temperatures in excess of 570° F. may be used, there is no particular advantage in using such elevated temperatures.

The synthesis pressure also may vary from about 450 to about 1000 p.s.i.g. If a synthesis pressure of substantially less than 450 p.s.i.g. is employed, then the synthesis of methanol will be adversely affected in that the degree of conversion of the reactants to methanol will be reduced thus increasing the quantity of recycle gas and the horsepower needed for operation of the recycle compressor.

It is preferred to utilize a synthesis pressure of from about 600 p.s.i.g. to about 850 p.s.i.g.

The catalyst used for the methanol synthesis may be either a single catalyst or a mixture of catalysts. It may be finely ground, pelleted, granular in nature, an extrusion using a binding agent, or any other suitable form.

Among the catalysts which may be used are partially reduced oxides of copper, zinc and chromium as a catalyst system, zinc oxide and chromium oxide, zinc oxide and copper, copper and aluminum oxide or cerium oxide, zinc oxide and ferric hydroxide, zinc oxide and cupric oxide, nickel in its elemental form, a copper zinc alloy, and oxides of zinc, magnesium, cadmium, chromium, vanadium and/or tungsten, with oxides of copper, silver, nickel, iron and/or cobalt, and the like. Other catalysts which are well known in the art may also be used and the invention is not to be construed as limited to any particular catalyst or catalyst system.

The methanol synthesis converter is a pressure vessel containing a charge of catalyst arranged in the vessel as a continuous bed or alternatively, as several independently supported catalyst beds. Facilities are provided in the converter to permit the injection of cold synthesis gas into the catalyst bed or between the catalyst beds in order to control the reaction temperature. The quantity of catalyst provided in the converter will depend on the methanol synthesis pressure employed, the synthesis gas composition, and the degree of conversion of synthesis gas to methanol per pass of synthesis gas over the catalyst bed or beds.

The space velocity employed in the methanol synthesis converter is from about 5000 to about 50,000 volumes of dry gas at standard conditions (60° F. and atmospheric pressure) per hour per volume of catalyst and preferably from about 7000 to about 25,000.

Prior to recovering the methanol product, the effluent from the methanol converter undergoes a heat exchange with a portion of the incoming synthesis gas in order to preheat the incoming synthesis gas to the initiation temperature of the methanol synthesis reaction.

The methanol converter effluent is then water cooled to condense the methanol and water formed in the methanol synthesis converter. The amount of water contained in the crude methanol will depend upon the amount of carbon dioxide reacting in the methanol synthesis converter and the amount of water present in the methanol synthesis gas. The amount of carbon dioxide converted in the reactor and the quantity of water introduced with the make up gas in the synthesis loop will depend upon the desired ammonia to methanol production ratio. Generally, for an ammonia to methanol production ratio of 2 to 1, the crude methanol will contain about 23 percent by weight of water.

Any suitable system may be used for purifying the crude methanol. One such suitable system comprises a topping column operating at low pressure of up to about 20 p.s.i.g. which consists of a plurality of bubble trays designated to remove light components contained in the crude methanol. The number of bubble trays employed will vary depending upon the desired purity of the refined methanol, the pressure used in the column, the amount of heat supplied to the column and other factors.

The partially refined methanol is then sent to a refining column. This column operates at low pressure, for example about 30 p.s.i.g. and separates methanol from water and high boiling organic compounds. The number of bubble trays employed in the refining column may also vary.

Purge gases from the methanol synthesis loop are cooled to remove methanol and reaction by-products from the purge stream. The methanol and reaction by-products are then cycled into the methanol purification facilities and are purified as described above.

AMMONIA PRODUCTION, WATER-GAS SHIFT CONVERSION

The purge gas from which methanol and reaction by-products have been removed is of the following composition based on an ammonia to methanol production ratio of about 2.0 to 1.0.

| | Percent by volume |
|---|---|
| Carbon monoxide | 8.40 |
| Carbon dioxide | 9.20 |
| Hydrogen | 58.90 |
| Nitrogen | 21.83 |
| Argon | 0.28 |
| Methane | 1.39 |
| | 100.00 |

This purged (or raw ammonia synthesis) gas set forth above contains sufficient nitrogen for a given ammonia production rate due to the introduction of air during reforming. If nitrogen has not been introduced during reforming or is introduced in an amount insufficient to satisfy the nitrogen requirement for a given ammonia production rate, sufficient nitrogen to satisfy said ammonia requirement is introduced, using standard gas introducing means, subsequent to methanol synthesis and prior to ammonia synthesis. The raw ammonia synthesis gas also contains sufficient actual and equivalent hydrogen for said given ammonia production rate. The purge gas is fed, after heating and the introduction of steam, to a high temperature shift converter which converts the bulk of the unreacted carbon monoxide to carbon dioxide and hydrogen.

The high temperature shift conversion is accomplished at elevated temperature and pressure using a catalyst.

The catalyst used for the high temperature shift conversion may be any polyvalent metal or oxide thereof capable of converting carbon monoxide to carbon dioxide. Among the catalysts which may be used are iron oxide, nickel oxide, cobalt oxide, chromia, molybdena and tungsten oxide and the like. Other catalysts may also be used and such other catalysts will be obvious to one skilled in the art.

The space velocity during the high temperature shift conversion may range from about 1000 to about 5000 volumes of dry gas at standard conditions (60° F. and atmosphere pressure) per hour per volume of catalyst and preferably from about 2000 to about 3000.

The inlet temperature for the high temperature shift converter will vary from about 600° F. to about 800° F. Because the shift conversion reaction is exothermic, the temperature of the gas in the course of its passage over the catalyst will rise beyond that of the inlet temperature. Therefore, the outlet temperature from the converter will vary from about 700° F. to about 900° F.

The major portion of the conversion of carbon monoxide is completed in the high temperature shift converter. The gases are then cooled in a heat exchanger and the recovered heat may be used to generate steam. The cooled gases are then fed to a low temperature shift converter which substantially completes the conversion of carbon monoxide to carbon dioxide with the production of a corresponding amount of hydrogen.

If desired, a low temperature shift converter need not be employed and the conversion of a major portion of the carbon monoxide will take place in the high temperature shift converter.

The pressure used in the low temperature shift converter will be substantially the same as that employed in the high temperature shift converter, i.e., between about 450 to about 1000 p.s.i.g., depending upon the pressure used for methanol synthesis.

The low temperature shift conversion is accomplished using an inlet temperature of from about 350° F. to about 600° F. and an outlet temperature of from about 400° F. to about 650° F.

The steam-gas ratio for both the high temperature and low temperature shift conversion will be from about 0.5 to 1 to about 1 to 1. However, lower or higher ratios of steam to dry gas may also be used depending on the design requirements of the manufacturing facility.

The space velocity utilized in low temperature shift conversion depends upon the degree of carbon monoxide conversion desired and the steam-dry gas ratio employed. Generally, the space velocity may vary from about 2000 to about 4000 volumes of dry gas at standard conditions (60° F. and atmospheric pressure) per hour per volume of catalyst. It is preferred to utilize space velocities of from about 2500 to about 3500.

The catalyst for water shift conversion may be in any suitable form such as granules, pellets, tablets, and the like.

The cooled gases are then conducted to a carbon dioxide removal system where carbon dioxide is removed prior to ammonia synthesis.

CARBON OXIDE REMOVAL FROM AMMONIA SYNTHESIS GAS

Carbon dioxide is removed from the ammonia synthesis gas by passing the gas through a vessel in which is circulated a regenerative solvent capable of removing carbon dioxide.

Among the solvents which may be used to remove carbon dioxide are monoethanolamine, hot potassium carbonate, hot potassium carbonate and an additive such as arsenic, diethanolamine and the like.

The gases now have the major portion of carbon dioxide removed therefrom. However, there are still some carbon oxides in the gases which may be removed to avoid poisoning the ammonia synthesis catalyst.

Any remaining carbon dioxide and residual carbon monoxide are removed from the system, to a level of less than 10 parts per million, by catalytically converting (methanating) residual carbon oxides to methane via reaction with some of the hydrogen in the synthesis gas.

The temperature for such conversion will vary. The inlet temperature in the methanation chamber will vary from about 500 to about 600° F. and the outlet temperature will vary from about 600 to about 750° F.

The pressure at which methanation is accomplished may vary from about 500 to about 750 p.s.i.g. Other pressure may be used depending on the pressure used in the methanol synthesis loop. The catalyst which may be used may be a partially reduced nickel oxide catalyst or any other suitable catalyst. Such catalysts are well known in the art and the invention is not to be construed as limited to any particular methanation catalyst.

Heat is then removed from the final ammonia synthesis gas and the recovered heat may be used to heat boiler feed water.

The final synthesis gas is then conducted to a compressor where the gas is compressed to ammonia synthesis pressure.

Any standard compressor may be used. However, it is preferred for reasons of economy to use a centrifugal compressor.

AMMONIA SYNTHESIS

The compressed, purified ammonia synthesis gas is combined with a recycle stream from the ammonia converter and is delivered to the ammonia synthesis converter where, under the influence of pressure, elevated temperature and a catalyst, ammonia is synthesized.

Th ammonia synthesis pressure may vary from about 1500 to about 10,000 p.s.i.g. It is preferred, however, to use a pressure of between about 2100 and 3500 p.s.i.g.

The temperature at which the gases are converted to ammonia varies depending upon the type of ammonia converter employed as well as the synthesis pressure and other factors. Generally, a quench type converter provided with several catalyst beds is used. With that type of converter, the first catalyst bed operates at an inlet temperature of about 750° F. and an outlet temperature of about 975° F. Succeeding catalyst beds operate at lower outlet temperatures of from about 840° F. to about 900° F. depending on the pressure level employed.

Any suitable catalyst for catalytic ammonia synthesis may be used. For example, iron oxide is generally used as the ammonia synthesis catalyst. Other catalysts may be used such as iron, an iron cyanide complex, aluminosilicates such as sodium alumino-silicate zeolite, magnesium alumino-silicate zeolite and the like. Moreover, the iron catalyst may be promoted with potassium oxide, aluminum oxide, chromium, cerium and the like.

The volume of catalyst used depends upon the gas composition and operating conditions. Generally, the higher the ammonia synthesis pressure employed, the smaller the required catalyst volume. Additionally, the higher the level of inert gases in the ammonia synthesis converter, the greater the catalyst volume needed.

Inert argon and methane are purged from the system in order to maintain the desired degree of ammonia conversion. Ammonia product is then condensed in the converter effluent circuit and delivered to storage equipment.

The various chambers or zones, are connected to one another via a suitable arrangement of pipes and valves interspersed in the proper places.

The process and unified manufacturing facility require only a single steam generating system for the entire process and facility. This eliminates costly duplication of a steam generating system if a separate ammonia and a separate methanol manufacturing facility is employed.

Moreover, the ratio for a given methanol production rate to a given ammonia production rate may be varied to produce more methanol and less ammonia or more ammonia and less methanol. It is even possible to produce methanol or ammonia beyond the rated capacity of the methanol or ammonia facilities by eliminating or reducing the production of methanol or ammonia.

If it is desired to produce only methanol and no ammonia from the integrated facility, then the process is modified by not introducing nitrogen during the reforming of the hydrocarbon feed and by preventing the purge gases from entering the shift converter. This is easily done by a system of valving so that purge gases from the methanol synthesis system are discharged to the plant fuel system.

If it is desired to produce only ammonia from the integrated facility, then the amount of feed used is reduced and the conditions for reforming and associated equipment are adjusted to satisfy the requirements for a given ammonia production rate. Additionally, the methanol synthesis loop is by-passed and the synthesis gas is conducted to the high temperature shift converter.

Such versatility in the integrated methanol-ammonia manufacturing facility of this invention is particularly advantageous because the manufacturing facility and process are responsive to changes in economic factors. Additionally, because of the unity of the manufacturing facility of this invention, costly equipment, such as duplicate desulfurization equipment, duplicate steam generating facilities, a carbon dioxide compressor, a hydrocarbon reforming furnace and associated equipment which normally would have to be included in separate manufacturing facilities are eliminated.

While this invention has been described in terms of certain preferred embodiments and illustrated by means of specific examples, the invention is not to be construed as limited except as set forth in the following claims.

What is claimed is:

1. An integrated process for the production of methanol and ammonia comprising:
   (a) reforming a hydrocarbon feed with steam in a reforming zone to produce a synthesis gas stream comprising hydrogen and carbon oxides at a pressure of about 250 to about 1000 pounds per square inch gauge at the exit of the reforming zone;
   (b) passing said synthesis gas stream, at a pressure of about 450 to about 1000 p.s.i.g., to a low pressure methanol synthesis zone and therein catalytically converting a portion of said synthesis gas stream to methanol by passing said synthesis gas stream over a low pressure methanol synthesis catalyst at a temperature of about 320° F. to about 570° F.;
   (c) removing a second portion of said synthesis gas stream from the low pressure methanol zone and passing said second portion, together with steam, to a water shift conversion zone wherein carbon monoxide in said synthesis gas stream and steam are converted, in the presence of water shift conversion catalyst and at a temperature of about 600 to 900° F. and at a pressure of about 450 to 1000 pounds per square inch gauge to carbon dioxide and hydrogen thereby producing a converted gas stream;
   (d) passing said converted gas stream to a carbon dioxide removal zone wherein essentially all of the carbon dioxide is removed from the converted gas stream to produce a carbon dioxide free stream;
   (e) passing said carbon dioxide free stream to a methanation zone wherein essentially all the residual carbon oxides are methanated to produce a methanated stream; and
   (f) passing said methanated stream to an ammonia synthesis zone and therein producing ammonia by passing said methanated stream together with nitrogen over an ammonia synthesis catalyst at temperatures of about 750° F. to about 975° F. and pressures of about 1500 p.s.i.g. to about 10,000 p.s.i.g.

2. The process of claim 1 wherein the reforming zone comprises a primary and a secondary reformer and an oxygen-containing gas is introduced into said reforming zone.

3. The process of claim 2 wherein said oxygen-containing gas also contains at least part of the nitrogen required for ammonia production.

4. The process of claim 3 wherein the oxygen-containing gas is air.

5. The process of claim 4 wherein the temperature of the hydrocarbon feed into the primary reformer is about 600° to about 1200° F. and the temperature exit the primary reformer is about 1350° F. to about 1700° F.

6. The process of claim 5 wherein the temperature exit the secondary reformer is about 1650° F. to about 1950° F.

7. The process of claim 1 wherein the synthesis gas exit the secondary reformer is passed to the low pressure methanol synthesis zone at a pressure of about 600 p.s.i.g. to about 850 p.s.i.g.

8. The process of claim 1 wherein the low pressure methanol synthesis zone comprises the steps of passing the synthesis gas through a preheat zone, passing the preheated synthesis gas through a reactor containing methanol synthesis catalyst, passing the effluent of said reactor through the preheat zone and therein exchanging heat with the synthesis gas passed to the reactor, cooling the reactor effluent to condense therefrom methanol and water, and passing a portion of the uncondensed effluent for use as the second portion of the synthesis gas stream in step (c) of the process.

9. The process of claim 1 wherein the converted gas leaving step (c) of the process is passed to a second water shift conversion zone wherein residual carbon monoxide and steam in the converted gas stream is further converted, in the presence of low temperature water shift catalyst and at a temperature of about 350° F. to about 650° F. and at a pressure of about 450 to 1000 p.s.i.g., to additional carbon dioxide and hydrogen, such further converted gas then being passed to step (d) of the process.

10. The process of claim 1 wherein the synthesis gas at the exit of the reforming zone is at approximately the same pressure as the pressure of the synthesis gas passed to the methanol synthesis zone.

References Cited

UNITED STATES PATENTS

| | | | |
|---|---|---|---|
| 2,014,757 | 9/1935 | Blondelle | 23—199 |
| 3,310,376 | 3/1967 | Cook et al. | 23—199 |

OSCAR R. VERTIZ, Primary Examiner

H. S. MILLER, Asistant Examiner

U.S. Cl. X.R.

23—289; 260—449.5